(12) United States Patent
Cheng

(10) Patent No.: US 8,988,631 B2
(45) Date of Patent: Mar. 24, 2015

(54) FRAME AND LIQUID CRYSTAL DISPLAY DEVICE

(75) Inventor: Jiahe Cheng, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 347 days.

(21) Appl. No.: 13/522,019

(22) PCT Filed: Jun. 11, 2012

(86) PCT No.: PCT/CN2012/076689
§ 371 (c)(1),
(2), (4) Date: Jul. 13, 2012

(87) PCT Pub. No.: WO2013/181854
PCT Pub. Date: Dec. 12, 2013

(65) Prior Publication Data
US 2013/0321737 A1    Dec. 5, 2013

(30) Foreign Application Priority Data

Jun. 5, 2012   (CN) .......................... 2012 1 0183308

(51) Int. Cl.
*G02F 1/1333*   (2006.01)
*B23Q 3/00*   (2006.01)
*G02F 1/1335*   (2006.01)

(52) U.S. Cl.
CPC ............ *B23Q 3/00* (2013.01); *G02F 1/133308* (2013.01); *G02F 1/133608* (2013.01); *G02F 2001/133322* (2013.01)

USPC .............................. 349/58; 362/632; 362/634

(58) Field of Classification Search
CPC .................... G02F 1/133608; G02F 1/133308; G02F 2001/133314; G02F 2001/133322; G02B 6/0088
See application file for complete search history.

(56) References Cited

U.S. PATENT DOCUMENTS

| | | | |
|---|---|---|---|
| 2008/0278661 A1* | 11/2008 | Oh .................................. | 349/65 |
| 2013/0027965 A1* | 1/2013 | Noh et al. ...................... | 362/602 |
| 2013/0169886 A1* | 7/2013 | Kuromizu ....................... | 349/65 |

* cited by examiner

*Primary Examiner* — Richard Kim
*Assistant Examiner* — Ryan Crockett
(74) *Attorney, Agent, or Firm* — Andrew C. Cheng

(57) ABSTRACT

The present invention discloses a frame for pressing an optical film of a LCD device. The frame includes a supporting component and a loading component bending along from the edge of the supporting component. A first rib and a second rib are arranged on the side of the loading component adjacent to the supporting component for pressing the optical film along with the edge of the loading component, and the thickness of the first ribs is greater than that of the second ribs. The present invention further discloses a LCD device. According to the ways mentioned above, the first ribs and the second ribs with different thicknesses on the loading component of the frame fits for the optical films with two thicknesses to save cost and to conduce mass production.

6 Claims, 3 Drawing Sheets

FRAME AND LIQUID CRYSTAL DISPLAY DEVICE

BACKGROUND OF THE INVENTION

1. Field of the Invention

The present invention relates to a liquid crystal display field, and more particularly, to a frame and a liquid crystal display device.

2. Description of the Prior Art

It is necessary to use optical films in a backlight system of a liquid crystal display (LCD) device to fit for light source to get even brightness. Optical films and light sources are usually arranged in accommodation space formed by a frame and a bezel. Optical films in horizontal direction are fixed by riveting columns or positioning columns, and the optical films in vertical direction are fixed by ribs on a frame adjacent to the optical films or are pressed by cushioning material.

There is only one type of thickness of ribs when the frame in the prior art positions optical films, it just adopts the optical films having a single type of thickness. New LCD devices, however, develop more and more quickly, and the thickness of optical films probably changes with the backlight systems in the latest technique. Therefore, it is necessary to change a frame or cushioning material corresponding to the thickness of optical films for effectively restricting the optical films in vertical direction. And it raise cost for mass production.

SUMMARY OF THE INVENTION

An object of the present invention is to provide a frame and a LCD device for fitting for optical films with different thicknesses.

According to the present invention, a frame for pressing an optical film of an LCD device comprises a supporting component and a loading component bending along from the edge of the supporting component. A plurality of first ribs and a plurality of second ribs are arranged on a side of the loading component adjacent to the supporting component for pressing the optical film along with an edge of the loading component. The first ribs, the second ribs and the loading component are integrally molded. A thickness of the first ribs is greater than that of the second ribs. The plurality of first ribs are set up at intervals, and the plurality of the second ribs are set up alternately with the plurality of the first ribs.

In one aspect of the present invention, the loading component arranges at least one third rib, and a thickness of the third rib is smaller than that of the second rib.

According to the present invention, a frame for pressing an optical film of an LCD device comprises a supporting component and a loading component bending along from the edge of the supporting component. A plurality of first ribs and a plurality of second ribs are arranged on a side of the loading component adjacent to the supporting component for pressing the optical film along with an edge of the loading component. A thickness of the first ribs is greater than that of the second ribs.

In one aspect of the present invention, the plurality of first ribs are set up at intervals.

In another aspect of the present invention, the plurality of second ribs are set up with the plurality of the first ribs alternately.

In still another aspect of the present invention, the plurality of first ribs, the plurality of second ribs and the loading component are integrally molded.

In yet another aspect of the present invention, the loading component arranges a third rib, and a thickness of the third rib is smaller than that of the second rib.

According to the present invention, an LCD device comprises a light guide plate having a emitting surface, a side surface adjacent to the emitting surface and a bottom surface opposite to the emitting surface; a bezel leaning against the bottom surface of the light guide plate; an optical film set up on the emitting surface of the light guide surface; and a frame. The frame comprises a supporting component and a loading component bending along from the edge of the supporting component. A plurality of first ribs and a plurality of second ribs are arranged on a side of the loading component adjacent to the supporting component for pressing the optical film along with an edge of the loading component. A thickness of each first rib is greater than that of each second rib. The supporting component leans against the bezel and is set up at the side of the adjacent light guide plate, and the loading component is set up adjacently the optical film so that the plurality of first ribs or the plurality of second ribs are capable of pressing the optical film on the light guide plate.

In one aspect of the present invention, the plurality of first ribs are set up at intervals.

In another aspect of the present invention, the plurality of second ribs are set up with the plurality of the first ribs alternately.

In another aspect of the present invention, the plurality of first ribs, the plurality of second ribs and the loading component are integrally molded.

In another aspect of the present invention, the loading component arranges a third rib, and a thickness of the third rib is smaller than that of the second rib.

In another aspect of the present invention, the optical film is an optical film with a first thickness, and the plurality of first ribs press the optical film with the first thickness.

In another aspect of the present invention, a plurality of positioning lugs are arranged on an edge of the optical film with the first thickness at intervals, the positioning lugs aim at the plurality of first ribs, and a gap between the two adjacent positioning lugs aims at one of the second ribs.

In still another aspect of the present invention, the optical film is an optical film with a second thickness, and the plurality of second ribs press the optical film with the second thickness.

In yet another aspect of the present invention, a plurality of positioning lugs are arranged on the edge of the optical film with the second thickness at intervals, the positioning lugs aim at the plurality of second ribs, and a gap between the two adjacent positioning lugs aims at one of the first ribs so that the optical film with the second thickness is capable of preventing from contacting the first ribs.

In contrast to prior art, the frame and the LCD device according to the embodiment of the present invention set up first ribs and second ribs with different thicknesses from each other on a loading component of the frame to fit for the optical films with two thicknesses to save cost and to conduce mass production.

These and other features, aspects and advantages of the present disclosure will become understood with reference to the following description, appended claims and accompanying figures.

DETAILED DESCRIPTION OF THE PREFERRED EMBODIMENTS

For better understanding embodiments of the present invention, the following detailed description taken in conjunction with the accompanying drawings is provided. Apparently, the accompanying drawings are merely for some of the embodiments of the present invention. Any ordinarily skilled person in this art could still obtain other accompanying drawings based on the present accompanying drawings.

Figure 1:
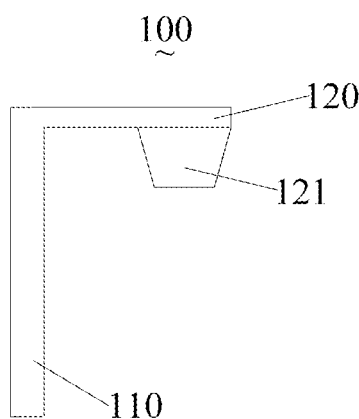
FIG. 1 shows a partial side view of a frame according to a first embodiment of the present invention.

Please refer to FIG. 1. FIG. 1 shows a partial side view of a frame according to a first embodiment of the present invention. A frame 100 comprises a supporting component 110 and a loading component 120 bending along from the edge of the supporting component 110. The supporting component 110 and the loading component 120 are integrally molded. The frame 100 is used for pressing the optical film of a LCD device (not shown). Components of a LCD device, such as a LCD panel, can be disposed on one side of loading component 120 away from the supporting component 110. First ribs 121 and second ribs (not shown in FIG. 1) are arranged along the edge of the loading component 120 adjacent to the supporting component 110.

Figure 2:
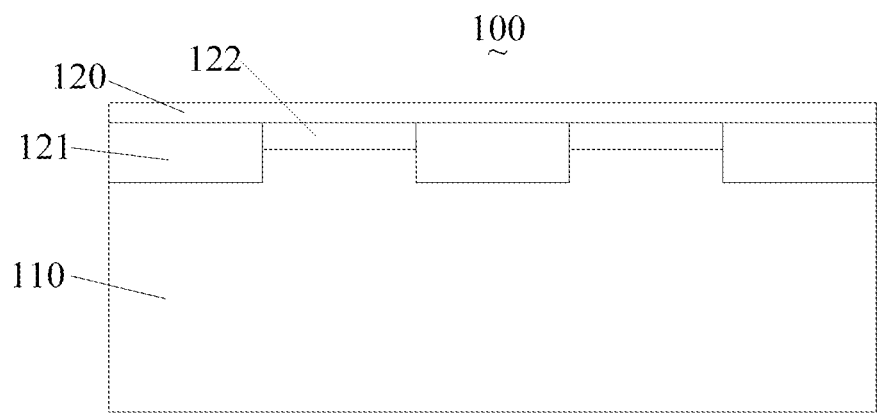
FIG. 2 shows a partial main view of the frame shown in FIG. 1.

In particular, please refer to FIG. 2 in conjunction. FIG. 2 shows a partial main view of the frame shown in FIG. 1. The first ribs 121 and the second ribs 122 are arranged along the edge of the loading component 120 adjacent to the supporting component 110 for pressing optical films.

The thickness of the first rib 121 is greater than that of the second rib 122. The first ribs 121, the second ribs 122 and the loading component 120 in the embodiment are integrally molded, and so do the first ribs 121 and the second ribs 122. In other embodiment, the first ribs 121 and the second ribs 122 are also fixed to the loading component 120 with glue or screws.

A plurality of the first ribs 121 and a plurality of second ribs 122 are set up alternately, i.e. each second rib 122 is set up between two first ribs 121. In another embodiment, a single first rib 121 and a single second rib 122 are proposed. A sum of the first ribs 121 and the second ribs 122 is equal or shorter than that of the loading component 120 in length.

The length of the first ribs 121 and the second ribs 122, however, is not necessary to be the same, and even each of the plurality of the first ribs 121 and the plurality of the second ribs 122 is not, either. The person skilled in the art is capable of setting up the length of the first ribs 121 and the second ribs 122 in need, and there is no limit in the present invention.

Figure 3:
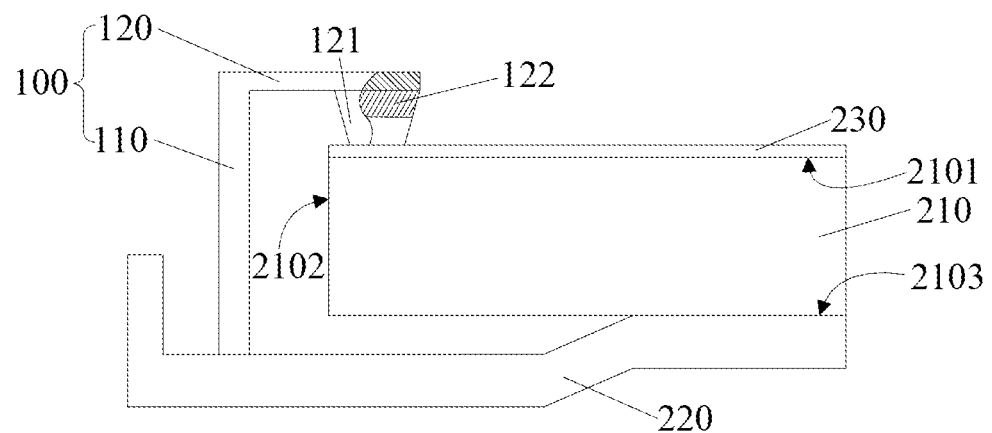
FIG. 3 shows a partial cross-sectional view of the LCD device according to an embodiment of the present invention

Referring to FIG. 3 showing a partial cross-sectional view of the LCD device according to an embodiment of the present invention, the frame 100 in the first embodiment is able to be used as the LCD device according to the embodiment.

The LCD device comprises a light guide plate 210, a bezel 220, a optical film 230 and a frame 100.

The light guide plate 210 has an emitting surface 2101, a side surface 2102 adjacent to the emitting surface 2101 and a bottom surface 2103 opposite to the emitting surface 2101. The bezel 220 leans against the bottom surface 2103 of the light guide plate 210. The optical film 230 is set up on the emitting surface 2101 of the light guide plate 210. The supporting component 110 leans against the bezel 220 and is arranged close to the side surface 2102 of the light guide plate 210, and the loading component 120 is set up close to the optical film 230 so that it is capable of pressing the optical film 230 to the light guide plate 210 by the first ribs 121 or the second ribs 122.

The optical film 230 in the embodiment can be an optical film with a first thickness or an optical film with a second thickness. The thickness of the first-thickness optical film is smaller than that of the second-thickness optical film. The optical film with the first thickness corresponds to the first ribs 121, and the optical film with the second thickness corresponds to the second ribs 122. A sum of the optical film with the first thickness and the first ribs 121 is equal to that of the optical film with the second thickness and the second ribs 122 in thickness within an error range.

Figure 4:
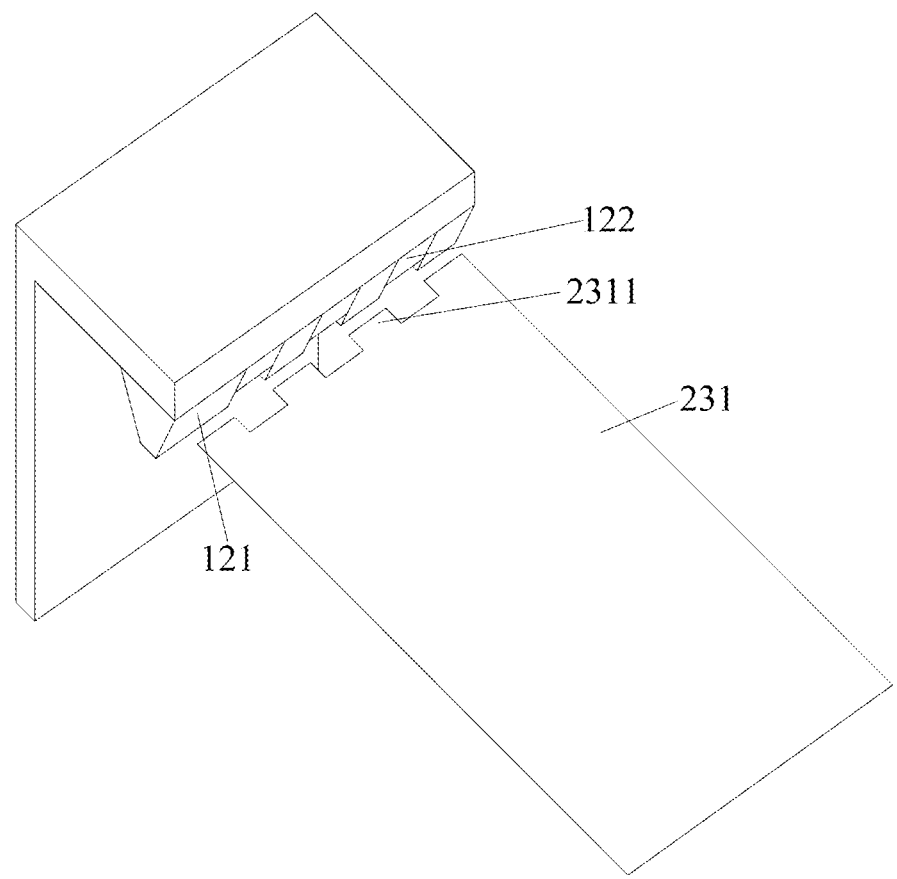
FIG. 4 shows a schematic diagram of positioning the optical film on the frame of the LCD device in FIG. 3 according to a preferred embodiment of the present invention.

Please refer to FIG. 4 in conjunction to FIG. 3. FIG. 4 shows a schematic diagram of positioning the optical film on the frame of the LCD device in FIG. 3 according to a preferred embodiment of the present invention.

The thickness of the optical film 230 corresponds to that of the first ribs 121 when the optical film 230 is the first-thickness optical film 231, and the first ribs 121 press the first-thickness optical film 231. In detail, there are a plurality of positioning lugs 2311 set up at intervals on the edge of the first-thickness optical film 231, each positioning lug 2311 correspondingly aims at the first ribs 121, and gaps between two adjacent positioning lugs 2311 aims at the second ribs 122 so that the first ribs 121 to press the position lugs 2311 to restrain the first-thickness optical film 231 to move. Furthermore, considering saving cost and that the second ribs 122 are enable to block the first-thickness optical film 231, it is allowed not to arrange the positioning lugs 2311 on the edge of the first-thickness optical film 231 to make the first ribs 121 press the first-thickness optical film 231 directly.

Figure 5:
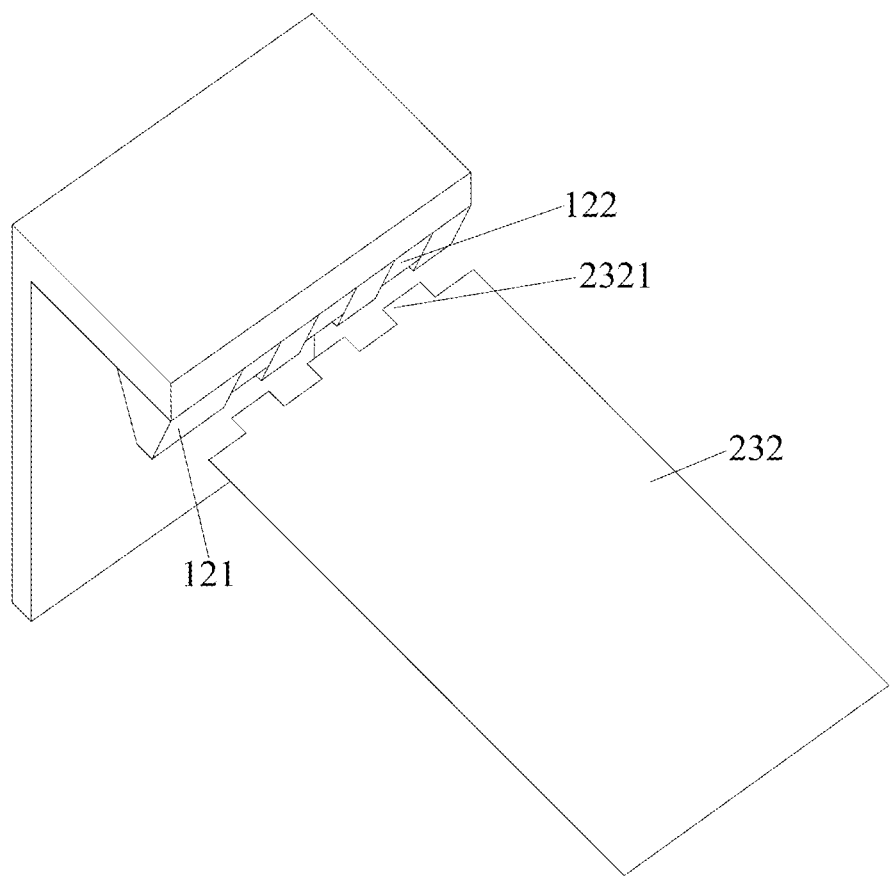
FIG. 5 shows a schematic diagram of positioning the optical film on the frame of the LCD device in FIG. 3 according to another preferred embodiment of the present invention.

Please refer to FIG. 5 in conjunction to FIG. 3. FIG. 5 shows another schematic diagram of positioning the optical film on the frame of the LCD device in FIG. 3 according to another preferred embodiment of the present invention.

The thickness of the optical film 230 corresponds to that of the second ribs 122 when the optical film 230 is the second-thickness optical film 232, and the second ribs 122 press the second-thickness optical film 232. In detail, there are a plurality of positioning lugs 2321 set up at intervals on the edge of the second-thickness optical film 232, each positioning lug 2321 correspondingly aims at the second ribs 122, and gaps between two adjacent positioning lugs 2321 aims at the first ribs 121 to prevent the second-thickness optical film 232 from contacting the first ribs 121 to restrain the second-thickness optical film 232 to move.

Therefore, no matter the optical film 230 is the first-thickness optical film 231 or the second-thickness optical film 232, both uses the frame 100 in common. In other words, the frame 100 fits for the two optical films with different thicknesses. It is capable of saving cost and mass production without changing frames and without using additional cushioning materials when the optical film 230 is replaced from the first-thickness optical film 231 to the second-thickness optical film 232.

It is noted that the four edges of the optical films 230 are all capable of being pressed by the frame 100. In hence, all the four edges of the optical films 230 have correspondent positioning lugs.

In a practical operation, it allows the first ribs 121 and the second ribs 122 to have tiny elastic deformation which leads to some cushion to absorb thickness tolerance of the optical film 230 to protect the optical film 230 from damage when the first ribs 121 or the second ribs 122 press the optical film 230.

Figure 6:
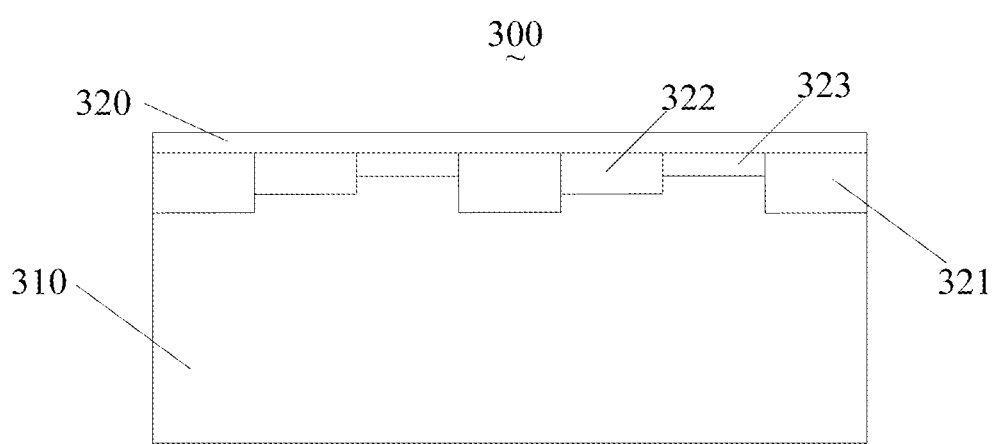
FIG. 6 shows a partial main view of the frame according to a second embodiment of the present invention.

Referring to FIG. 6 showing a partial main view of the frame according to a second embodiment of the present invention.

A frame 300 comprises a supporting component 310 and a loading component 320 bending along from the edge of the supporting component 310. First ribs 321, second ribs 322, and third ribs 323 are arranged along the side of the loading component 320 adjacent to the supporting component 310 for pressing optical films (not shown). A thickness of the first rib 321 is greater than that of the second rib 322, and a thickness of the second ribs 322 is greater than that of the third rib 323.

Each thickness of the first ribs 321, the second ribs 322 and the third ribs 323 is different to correspond to three optical films with different thicknesses. It is capable of positioning by arranging correspondent positioning lugs on the optical film. Here is no further description because the positioning way is the same with that according to the second embodiment.

The frame 100 comprises three ribs with different thicknesses in the embodiment. It is allowed to add ribs with different thicknesses in other embodiments. A person skilled in the art is aware of using four or more frames, each having different ribs in thickness by reading the embodiments in the present invention, any structure similar to the embodiments of the present invention belongs to the scope of the present invention.

In conclusion, the frame and LCD device according to the embodiment in the present invention arrange the first ribs and the second ribs with different thicknesses from each other on a loading component of a frame to fit for the optical films with two different thickness to save cost and to conduce mass production.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. An LCD device comprising:
a light guide plate having an emitting surface, a side surface adjacent to the emitting surface and a bottom surface opposite to the emitting surface;
a bezel leaning against the bottom surface of the light guide plate;
an optical film set up on the emitting surface of the light guide surface;
wherein the LCD device further comprises a frame, the frame comprises a supporting component and a loading component bending along from the edge of the supporting component, a plurality of first ribs and a plurality of second ribs are arranged on a side of the loading component adjacent to the supporting component for pressing the optical film along with an edge of the loading component, a thickness of each first rib is greater than that of each second rib, the supporting component leans against the bezel and is set up at the side of the adjacent light guide plate, and the loading component is set up adjacently the optical film so that the plurality of first ribs or the plurality of second ribs are capable of pressing the optical film on the light guide plate,
wherein the optical film is an optical film with a first thickness, the plurality of first ribs press the optical film with the first thickness, a plurality of positioning lugs are arranged on an edge of the optical film with the first thickness at intervals, the positioning lugs aim at the plurality of first ribs, and a gap between two adjacent positioning lugs aims at one of the second ribs.

2. The LCD device of claim 1, wherein the plurality of first ribs are set up at intervals.

3. The LCD device of claim 2, wherein the plurality of second ribs are set up with the plurality of the first ribs alternately.

4. The LCD device of claim 1, wherein the plurality of first ribs, the plurality of second ribs and the loading component are integrally molded.

5. The LCD device of claim 1, wherein the loading component arranges a third rib, and a thickness of the third rib is smaller than that of the second rib.

6. An LCD device comprising:
a light guide plate having an emitting surface, a side surface adjacent to the emitting surface and a bottom surface opposite to the emitting surface;
a bezel leaning against the bottom surface of the light guide plate;
an optical film set up on the emitting surface of the light guide surface;
wherein the LCD device further comprises a frame, the frame comprises a supporting component and a loading component bending along from the edge of the supporting component, a plurality of first ribs and a plurality of second ribs are arranged on a side of the loading component adjacent to the supporting component for pressing the optical film along with an edge of the loading component, a thickness of each first rib is greater than that of each second rib, the supporting component leans against the bezel and is set up at the side of the adjacent light guide plate, and the loading component is set up adjacently the optical film so that the plurality of first ribs or the plurality of second ribs are capable of pressing the optical film on the light guide plate,
wherein the optical film is an optical film with a second thickness, the plurality of second ribs press the optical film with the second thickness, a plurality of positioning lugs are arranged on the edge of the optical film with the second thickness at intervals, the positioning lugs aim at the plurality of second ribs, and a gap between two adjacent positioning lugs aims at one of the first ribs so that the optical film with the second thickness is capable of preventing from contacting the first ribs.

* * * * *